US009960951B1

(12) United States Patent
Cruickshank, III et al.

(10) Patent No.: US 9,960,951 B1
(45) Date of Patent: May 1, 2018

(54) SYSTEM, METHOD, AND MEDIUM FOR DETERMINING A FAILURE OF A NETWORK ELEMENT

(71) Applicant: CSC HOLDINGS, LLC, Bethpage, NY (US)

(72) Inventors: Robert Cruickshank, III, Big Indian, NY (US); Chris Cioffi, Farmingdale, NY (US); Thomas Brady, Shirley, NY (US); Maziar Hosseinzadeh, New York, NY (US); Jiyuan Qian, Jersey City, NJ (US); Gholamhosein Sheikholeslami, Glen Oaks, NY (US)

(73) Assignee: CSC HOLDINGS, LLC, Bethpage, NY (US)

( * ) Notice: Subject to any disclaimer, the term of this patent is extended or adjusted under 35 U.S.C. 154(b) by 42 days.

(21) Appl. No.: 15/070,907

(22) Filed: Mar. 15, 2016

(51) Int. Cl.
*H04L 12/24* (2006.01)

(52) U.S. Cl.
CPC .................. *H04L 41/0631* (2013.01)

(58) Field of Classification Search
CPC .................................................. H04L 41/0631
See application file for complete search history.

(56) References Cited

U.S. PATENT DOCUMENTS 7,796,500 B1 * 9/2010 Elliott ................. H04L 41/0681
370/216

2006/0146820 A1 * 7/2006 Friedman ................ H04L 45/00
370/390
2014/0003478 A1 * 1/2014 Liu .......................... H04B 3/46
375/224

OTHER PUBLICATIONS

U.S. Appl. No. 14/589,706 to Criuckshank, et al., "System and Method for Proactive Customer Access Network Maintenance", filed Jan. 5, 2015.
U.S. Appl. No. 14/918,768 to Cruickshank, et al., "System and Method for Task-Specific GPS-Enabled Network Fault Annunciator", filed Oct. 21, 2015.

* cited by examiner

*Primary Examiner* — Omar Ghowrwal
(74) *Attorney, Agent, or Firm* — Sterne, Kessler, Goldstein & Fox P.L.L.C.

(57) ABSTRACT

Embodiments detect issues in an outside plant utilizing a connectivity trail that indicates network elements (NEs) starting at the headend and ending at a distribution tap that serves one or more customer premise devices associated to a customer account. Embodiments determine a failed NE that serves the highest number of customers for which a trouble is reported to a ticketing system. Embodiments avoid reporting downstream child NEs that may be performing poorly due to the upstream failed parent NE. Embodiments associate the one or more customer premise devices, and a customer account with respective NEs of the connectivity trail, perform operational metric tests to determine whether a customer premise device associated with a customer account has failed, determine when an NE of the connectivity trail has failed. Embodiments also include rebooting the failed NE and/or notifying a ticketing system accordingly.

20 Claims, 6 Drawing Sheets

| Network Element | Trail 1 | Trail 2 | Trail 3 | Trail 4 | Trail 5 | Trail 6 | Trail 7 |
|---|---|---|---|---|---|---|---|
| Tap 208f | Node 280 (segmentable node: Model 1) | Splitter 288 (coaxial splitter: Type 2) | Trunk amplifier 282 (trunk amplifier: Model 1A) | Bridge amplifier 284 (bridge amplifier: Model 2A) | Line extender amplifier 286b (line extender amplifier: Model 3A) | Tap 208c (distribution tap: Model B) | Tap 208f (distribution tap: Model C) |

FIG. 2B

SYSTEM, METHOD, AND MEDIUM FOR DETERMINING A FAILURE OF A NETWORK ELEMENT

BACKGROUND

Field

Embodiments generally relate to cable networks and include detecting and managing problems in an outside plant of a cable system.

Background Art

Cable systems detect and manage failures in cable networks. Failures in network elements that serve a large number of accounts are typically detected when a significant portion of the accounts served by the network element are negatively affected.

BRIEF DESCRIPTION OF THE DRAWINGS/FIGURES

FIG. 2B illustrates an example connectivity trail in tabular form according to an embodiment;

DETAILED DESCRIPTION OF EMBODIMENTS

Figure 1:
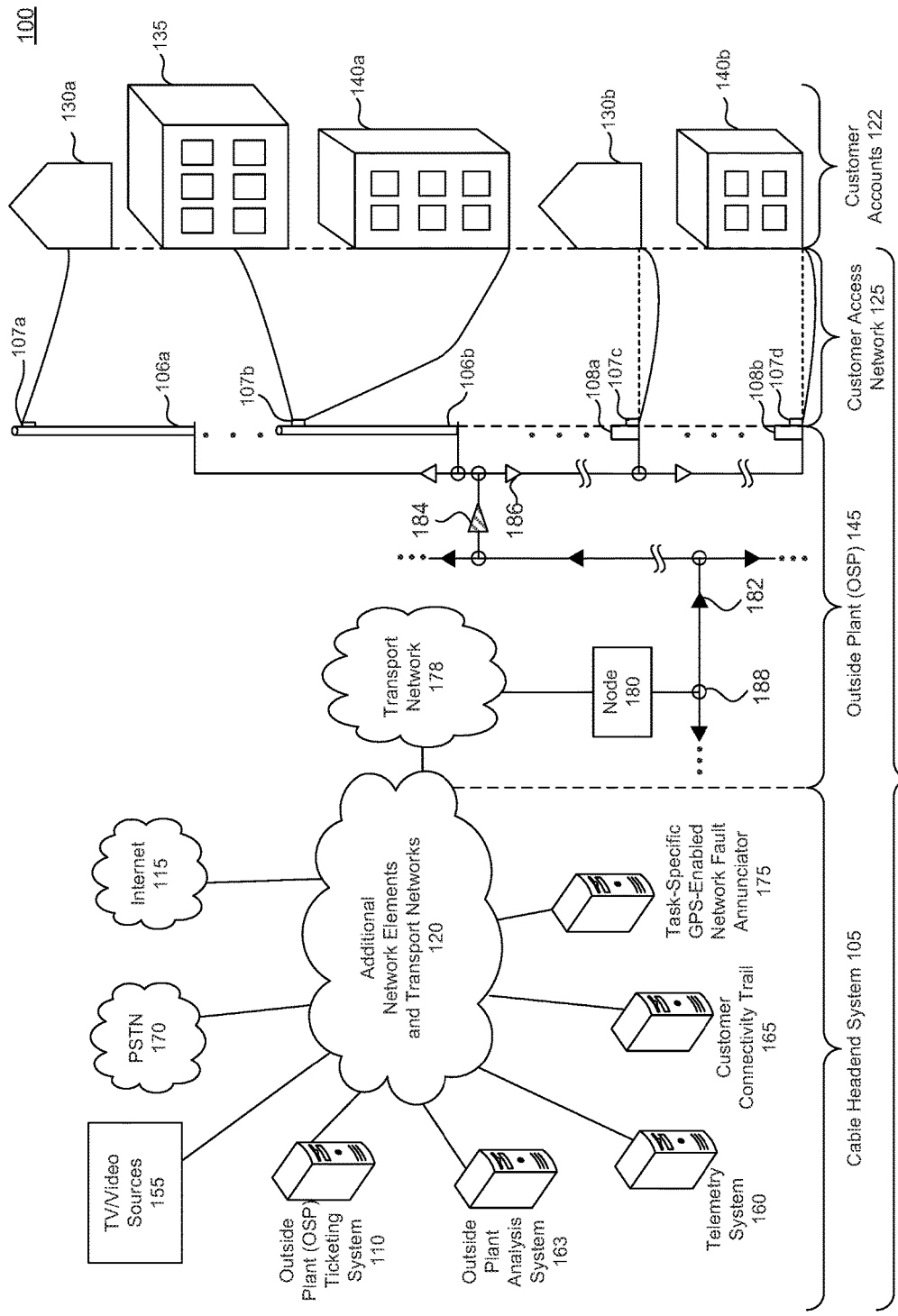
FIG. 1 illustrates an example system according to an embodiment.

In conventional cable networks, cable headends are coupled to transport networks and nodes, where nodes are network elements (NEs) that serve a geographic region of about 500 customer accounts. A node typically supports a connectivity trail of about 100 downstream NEs that are coupled to customer premise devices associated with a customer account. Current cable network monitoring node analytics detect node problems when 20% or about 100 of the customer accounts experience service problems. The lack of visibility in the connectivity trail of NEs is problematic, and results in a service provider reactively addressing issues (e.g., after a customer reports a trouble).

Embodiments detect issues in an outside plant utilizing a connectivity trail of NEs that indicates how NEs are connected within a geographic region that may be served by a cable headend. Embodiments provide visibility into the performance of NEs, and the connectivity trail from a customer premise device associated with a customer account upstream to a cable headend system or the core of a cable network. Being able to detect small and sometimes intermittent issues along the connectivity trail of NEs allows a service operator to detect degraded service, and proactively address issues before a large number of customers are negatively affected. For example, when a branch of network elements on the connectivity trail are determined to be performing poorly, embodiments enable a service operator to detect a failed parent NE (e.g., an upstream contiguous NE) of the branch that is closest to the node and take actions to have the failed parent NE repaired. This saves time, effort, and expense compared to addressing the downstream child NEs, as the failed parent NE may be the cause of the downstream child NEs performing poorly.

For example, physical level measurements collected from customer premise devices are associated with a customer account, and are compared against operational metric threshold values to determine whether any of the customer premise devices, and hence the customer account, is considered failed. The information regarding the status of the customer account (e.g., failed or not failed) is associated with the trail of network elements (NEs) in a service operator system from the customer premise devices (e.g., customer account) to the core (e.g., a node) so that NEs associated with a highest number of customer accounts with a failed status can be readily identified and addressed. In addition, performance measurements for each of the NEs on the trail of NEs may be collected to determine whether an NE is failing. Operational metric data and NE performance measurements may be used together to determine the effects on customer accounts.

Embodiments include a system, method, and a computer program product that detect and map outside plant issues. Embodiments include obtaining a connectivity trail of NEs that begins at a cable headend and extends toward a customer premise device, associating the customer premise device with a customer account, and associating the customer premise device and the customer account with respective parent NEs of the connectivity trail. In another example, a connectivity trail of NEs may begin at an NE between the cable headend and a customer premise device. In addition, embodiments include determining when the customer premise device fails based on an operational metric type, calculating a percentage of failed customer accounts for an NE of the connectivity trail, and determining when the NE has failed. Performance measurements of each NE of the connectivity trail may also be used to determine when the NE has failed. When the NE has failed, embodiments include notifying a ticketing system, rebooting the NE, or taking any other appropriate action to address the failure. An example of an appropriate action may be to perform a self-diagnosis operation by the failed NE. To perform self-diagnosis, the NE may run some instructions to detect what the source of failure is. Or, another example of an appropriate action may be to perform a self-repair operation by the NE. To perform the self-repair operation, the NE may run some instructions to solve the problem that is causing the problem, for example it may run instructions to reboot itself.

Embodiments also include determining when the customer premise device fails by receiving an operational metric type, obtaining physical level measurement data associated with the customer premise device, comparing the physical level measurement data with a threshold value of the operational metric type, and based on the comparison, determining when the customer premise device fails.

Embodiments further include calculating a percentage of failed customer accounts for the NE by determining a total number of customer accounts associated with the NE, determining a number of failed customer accounts associated with the NE, and dividing the number of failed customer accounts associated with the NE by the total number of customer accounts associated with the NE.

In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments" does not require that all embodiments include the discussed feature, advantage or mode of operation. Alternate embodiments may be devised without departing from the scope of the disclosure, and well-known elements of the disclosure may not be described in detail or may be omitted so as not to obscure the relevant details. In addition, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

FIG. 1 illustrates an example system 100 according to an embodiment. System 100 includes a service operator system 150 that serves customer premise devices associated with customer accounts 122. Service operator system 150 such as a cable system, includes cable headend system 105, outside plant (OSP) 145, and customer access network 125.

Service operator system 150 supports a range of services including but not limited to television and video services, Internet access, and Voice over Internet Protocol (VoIP) services. For example, a television program may be broadcast from TV/Video sources 155 through a cable modem termination system (CMTS) of additional NEs and transport networks 120 to OSP 145 and customer access network 125 to deliver the television program to a customer premise device in house 130a. One or more customer premise devices (e.g., one or more DOCSIS devices) associated with a customer account in house 130a may communicate with a service operator system 150 where communication may be bidirectional.

OSP 145 (e.g., a trunk system and a distribution system) may include but is not limited to transport network 178 (e.g., a high-speed two-directional transport network such as a hybrid fiber-coaxial (HFC) network that includes optical fiber and/or coaxial cable), node 180, splitters 188, trunk lines coupled to trunk amplifiers 182, bridge amplifier 184 that couples a trunk line to a branch line, line extender amplifier 186, cable poles 106 to provide a pole-to-pole connection, pedestals 108 such as a repeater, an optical line terminal, or a passive optical network (not shown). Transport network 178 may also include hubs, trunks, and NEs that support transporting signals from a cable headend system to a node. Node 180 may convert optical signals to electrical signals sent over the OSP 145 and may convert electrical signals from customer premise devices to optical signals that are sent over transport network 178 to additional NEs and transport networks 120. OSP 145 terminates at distribution taps 107a-d. A distribution tap 107 may be associated with customer access network 125 and one or more distinct customer accounts. For example, tap 107d coupled to building 140b may support more than one distinct customer account. Although OSP 145 depicts node 180 supporting customer accounts associated with buildings 130a, 130b, 135, 140a, and 140b, node 180 may support a large geographic region including over 500 distinct customer accounts for example. Node 180 may include over a hundred different NEs (e.g., splitters, amplifiers, taps), and service operator system 150 may include many nodes, and support millions of distinct customer accounts. Although one node is shown, there may be many nodes and other NEs in system 100.

Cable headend system 105 includes but is not limited to outside plant (OSP) ticketing system 110, outside plant analysis system 163, telemetry system 160, customer connectivity trail 165, task-specific global positioning system (GPS)-enabled network fault annunciator 175, TV/Video sources 155, as well as access to the Public Switched Telephone Network (PSTN) 170 and the Internet 115.

Outside plant (OSP) ticketing system 110 manages trouble tickets associated with repairs of the OSP 145 for various OSP faults. The various OSP faults can include a failure associated with at least one of: a node, an amplifier, a splitter, a repeater, a cable, a pole-to-pole connection, an optical line terminal, or a passive optical network to provide some examples. For example, OSP ticketing system 110 may electronically receive notifications of OSP faults from outside plant analysis system 163. OSP ticketing system 110 enters fault information, creates a ticket which becomes a pending ticket, and then assigns the pending ticket to a technician, thus the pending ticket becomes an assigned ticket.

Telemetry system 160 may collect and store measurements including physical level measurements such as received power levels and signal to noise ratios, to detect faults in OSP 145. For example, telemetry system 160 may collect, store, and analyze data including performance measurements, from elements in OSP 145 (e.g., node 180, a trunk amplifier 182, a bridge amplifier 184, a repeater, a line extender amplifier 186) and detect a fault. In another example, telemetry system 160 may collect and store, physical level measurements and/or operational metrics from each customer account. The physical level measurements and/or the operational metrics may be compared against a threshold value as a pass/fail test based on physical level measurements such as received power levels and signal to noise ratios associated with a customer premise device (e.g., a DOCSIS device) of a customer account.

Figure 2A:
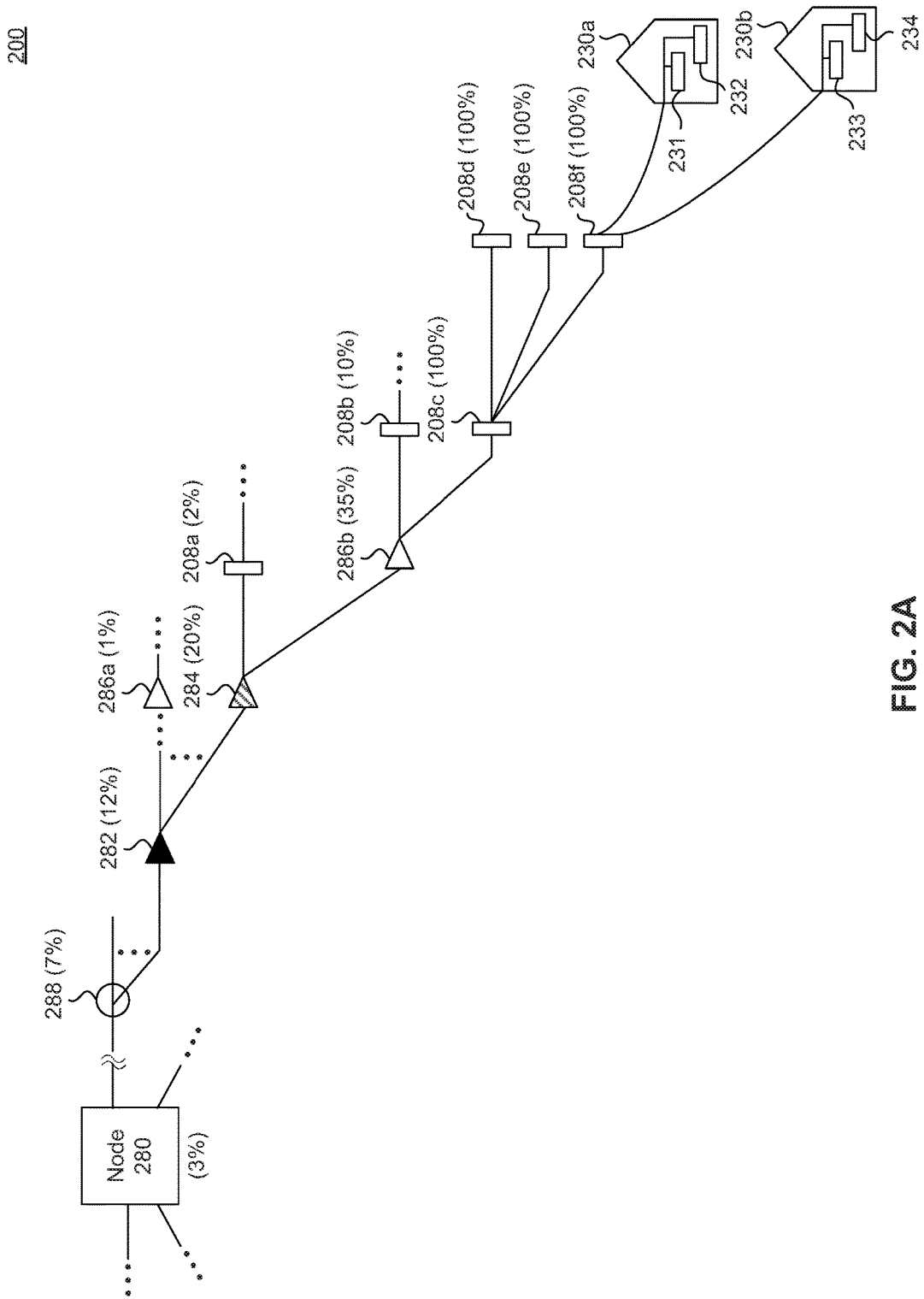
FIG. 2A illustrates an example connectivity trail according to an embodiment.

Customer connectivity trail 165 creates and/or includes a map of the NEs of system 100 indicating the contiguous connections among the various NEs, and may include the map in tabular form as an example. FIG. 2A illustrates an example connectivity trail 200 according to an embodiment. In this example, connectivity trail 200 is shown as a tree map starting with a root (e.g., node 280) branching to other NEs of OSP 145. Connectivity trail 200 may be one connectivity trail of a system 100 that includes many nodes. Each node supports distinct customer accounts in a geographic region such as 500 or more distinct customer accounts to provide an example. Connectivity trail 200 includes the NEs: node 280, splitter 288, trunk amplifier 282, bridge amplifier 284, line extender amplifiers 286a and 286b, and distribution taps 208a-208f. One or more distinct customer accounts are associated with each distribution tap 208. For example, customer accounts 230a that includes customer premise devices 231 and 232, as well as customer account 230b that includes customer premise devices 233 and 234 are associated with distribution tap 208f. A connectivity trail for a distinct customer account 230a includes one or more customer premise devices 231 and 232 coupled to distribution tap 208f. The connectivity trail for tap 208f includes the following contiguous upstream NEs (e.g., parent NEs): distribution tap 208c, line extender amplifier 286b, bridge amplifier 284, trunk amplifier 282, splitter 288, and node 280.

FIG. 2B illustrates an example connectivity trail in tabular form according to an embodiment. However, those skilled in the relevant art(s) will recognize that other forms are possible for the various connectivity trails of the present disclosure without departing from the spirit and scope of the present disclosure. For example, the various connectivity trails can be a tree map (as shown in FIG. 2A) a geographic map, a tabular arrangement, or a combination thereof.

The connectivity trail may be presented on a geographical map on a graphical user interface (GUI) along with a status of the parent NEs and customer accounts. In another embodiment, the status may include an indication of at least one of: a failed NE of the connectivity trail, an account of the plurality of accounts being online, an account of the plurality of accounts being offline, an account of the plurality of accounts partially failing, an account of the plurality of accounts recently determined to be partially failing, an account of the plurality of accounts that has failed, an account of the plurality of accounts recently determined to have failed, and an account of the plurality of accounts that has been selected.

In an embodiment, one or more processors are further configured to present a connectivity trail in at least one of: a tabular form, a geographic map, and a tree map.

As illustrated in FIG. 2B, the tabular format for the connectivity trail for a distribution tap may be a row that includes columns where each column includes information for each parent NE of the connectivity trail. Each column may include an identification number (e.g., a unique serial number and/or unique label) of a parent NE and/or the type of NE (e.g., a brand of equipment and/or a model number). For example, a connectivity trail in tabular format for distribution tap 208f based on FIG. 2A includes a table including columns of parent NEs on the connectivity trail starting with the most upstream NE (e.g., node 280) leading to the NE coupled to a distinct customer account (e.g., distribution tap 208f). In this example, the tabular form of the connectivity trail includes 7 parent NEs as shown in FIG. 2B: Trail 1—Node 280, Trail 2—Splitter 288, Trail 3—Trunk amplifier 282, Trail 4—Bridge amplifier 284, Trail 5—line extender amplifier 286b, Trail 6—Tap 208c, and Trail 7—Tap 208f. In some examples, the NE identity number may also include a location such as an address to provide an example.

Outside plant analysis system 163 obtains connectivity trail data from customer connectivity trail 165, obtains performance measurement data of customer premise devices associated customer accounts from telemetry system 160, determines whether customer premise devices and hence customer accounts are failing, and associates the failed customer accounts with respective parent NEs on the connectivity trail. The failed parent NEs closest to the node may be the cause of problems experienced by downstream child NEs and corresponding customers. By proactively analyzing the data, service operators may detect, identify, and proactively address a parent NE problem rather than one or more downstream child NE problems that may be a due to the parent NE problem. When a most upstream NE is determined to have failed, outside plant analysis system 163 may notify OSP ticketing system so that a ticket may be issued to begin repairs.

Task-specific global positioning system (GPS)-enabled network fault annunciator 175 proactively notifies a technician when a task the technician is currently assigned to address may be negatively impacted by a nearby fault (e.g., the task may be a futile work effort), and/or if the technician is qualified to repair a nearby fault. Task-specific global positioning system (GPS)-enabled network fault annunciator 175 is described in U.S. patent application Ser. No. 14/918,768, filed on Oct. 21, 2015, entitled *System and Method for Task-specific GPS-Enabled Network Fault Annunciator*, which is incorporated herein by reference in its entirety.

Referring back to FIG. 2A, a customer account such as 230a, may be associated with one or more customer premise devices (e.g., a DOCSIS device) 231 and 232. A customer premise device may include but is not limited to: a data modem, a telephony cable modem, a video cable modem (e.g., a cable modem combined with a set top box (STB)), a power supply cable modem, or a Wi-Fi™ cable modem. A cable modem device may include an Ethernet interface and/or a universal serial bus (USB) interface. Cable modem devices may connect to a variety of customer premise equipment (CPE) including, but are not limited to the following: a STB that may connect to television; routers that may include a wireless and/or wired home network such as a local area network; a computing device that may include but is not limited to a personal computer, a smart TV, or a laptop. Routers support equipment such as computing devices that may include but are not limited to personal computers, laptops, and tablets, as well as mobile cellular devices. Cable modems may be integrated with components such as a STB or a Multimedia Terminal Adapter (MTA) which is a VoIP adapter. For example, standard telephones may connect to an MTA to obtain VoIP service. Customer premise devices may respond to polls from telemetry system 160 for operational metrics and/or physical level measurements.

Figure 3:
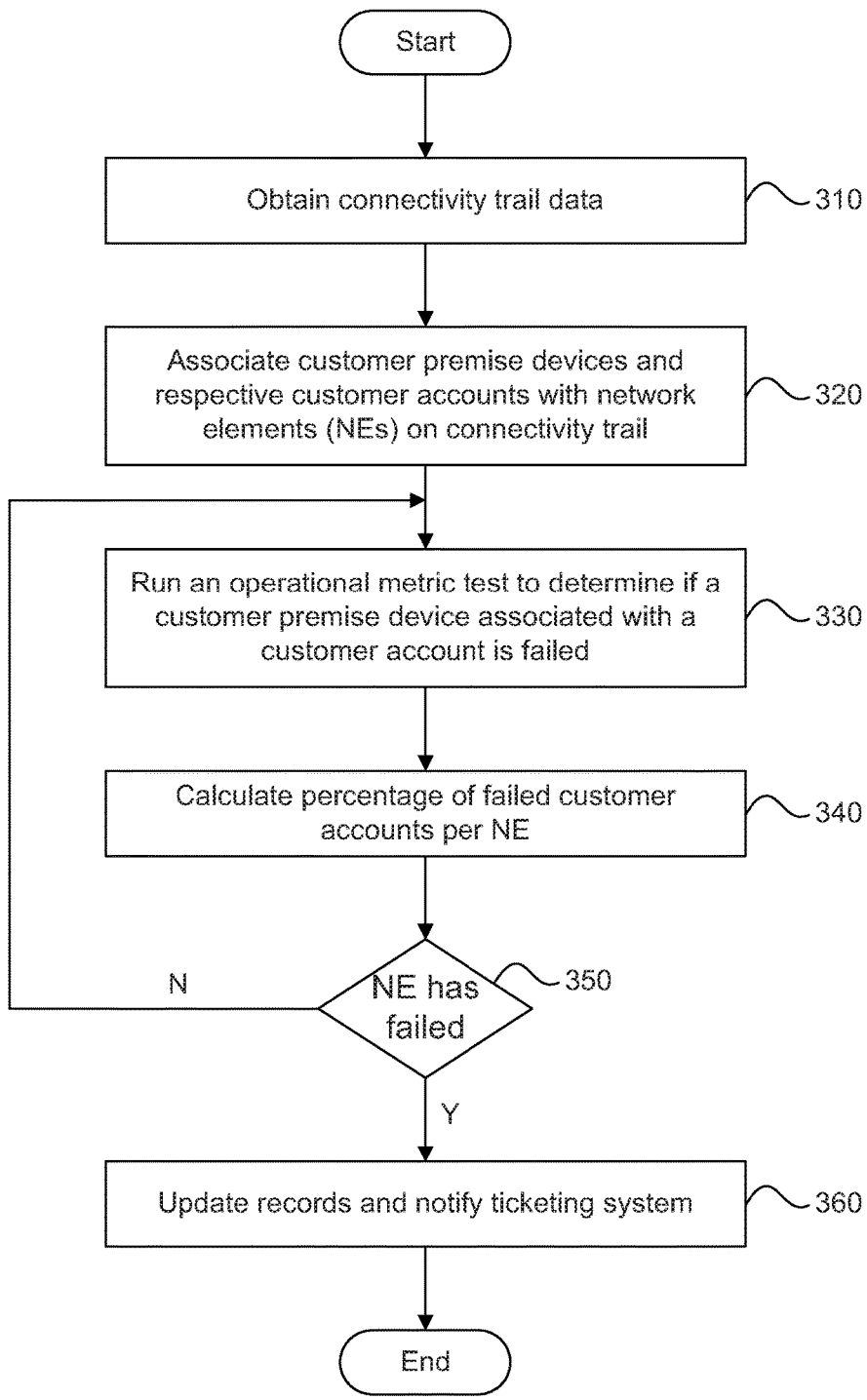
FIG. 3 illustrates a flow for determining outside plant issues according to an embodiment.

FIG. 3 illustrates a flow 300 for determining outside plant issues according to an embodiment. For ease of discussion, and without limitation, flow 300 will be described in terms of elements shown in FIGS. 1, 2A, and 2B. In an embodiment, outside plant analysis system 163 performs flow 300.

Flow 300 begins at step 310 where outside plant analysis system 163 may obtain a connectivity trail of contiguous NEs from customer connectivity trail 165. As an example, the connectivity trail of FIG. 2A begins at a node 280 and extends toward customer premise devices 231 and 232 associated with customer account 230a. Flow 300 proceeds to step 320.

At step 320, outside plant analysis system 163 may associate customer premise devices 231 and 232 with the respective customer account 230a with each parent NE on the connectivity trail that provides service to customer premise devices 231 and 232. As mentioned earlier, the connectivity trail for distinct customer account 230a includes the following parent NEs: distribution tap 208c, line extender amplifier 286b, bridge amplifier 284, trunk amplifier 282, splitter 288, and node 280. Each of those NEs is associated with customer account 230a as well as other subtending customer accounts such as 230b. For example, NE, distribution tap 208f, is associated with the customer accounts 230a and 230b including one or more customer premise devices 231, 232, 233, and 234 coupled to tap 208f. NE tap 208e is associated with the customer accounts including one or more customer premise devices coupled to tap 208e. The parent NE, tap 208c, is associated with the subtending customer accounts and respective customer premise devices coupled to child NEs: tap 208d, 208e, and 208f. Accordingly, line extender amplifier 286b, the parent NE of tap 208c, is associated with the subtending customer accounts and respective customer premise devices coupled to child NEs: taps 208b, 208c, 208d, 208e, and 208f. Parent NEs serve more customer accounts than child NEs. As an example, customer connectivity trail 165 may perform steps 310 and 320, and outside plant analysis system 163 may obtain the connectivity trail and customer account associations from customer connectivity trail 165. Flow 300 proceeds to step 330.

Figure 4:
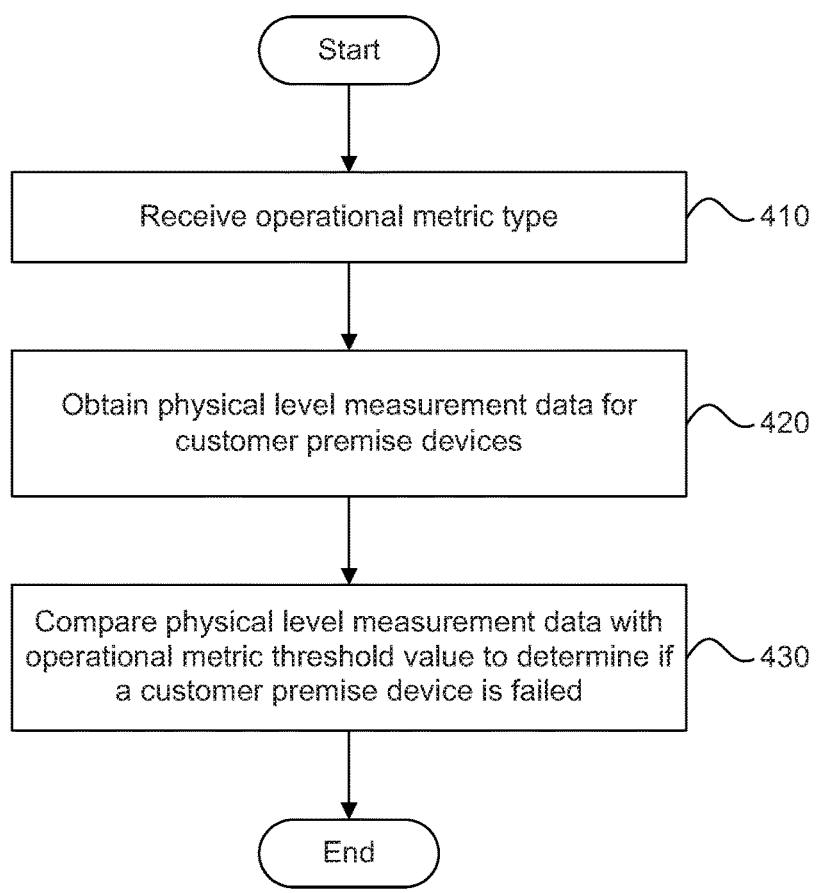
FIG. 4 illustrates a flow for determining a failed customer premise device according to an embodiment.

At step 330, outside plant analysis system 163 may run an operational metric test to determine if a customer premise device associated with a customer account is failed. FIG. 4 illustrates a flow 400 for determining a failed customer premise device according to an embodiment. For ease of discussion, and without limitation, flow 400 will be described in terms of elements shown in FIGS. 1, 2A, and 2B.

Flow 400 begins at step 410 when outside plant analysis system 163 receives an operational metric type. The operational metric type may be entered and the operational metric test performed on demand, or one or more operational metric tests may be performed according to a settable schedule. An operational metric is a test used to determine when a customer premise device is performing adequately or is considered failed. Each operational metric has a threshold value against which a physical level measurement or a range of physical level measurements of a customer premise device is compared. Based on the comparison, a customer premise device may be considered as operating properly or as being failed. Outside plant analysis system 163 may also receive performance measurements (e.g., from telemetry system 160, or from elements in OSP 145, or from any other NEs) to determine whether an element has failed. As an example, a performance measurement may include an operational metric as shown in Table 1.

As is well known to a person of ordinary skill in the art, signals sent from a cable headend system 105 to a customer premise device (e.g., a cable modem (CM)) are downstream signals. Signals sent from a customer premise device to cable headend system 105 (e.g., to telemetry system 160) are upstream signals.

Table 1 below includes some types of operational metrics that may be applied to physical level measurement data collected from customer premise devices.

Examples of Operational Metrics

| Operational Metric Type | Description |
| --- | --- |
| US CER | Average Hourly Upstream Uncorrectable Codeword Error Rate in % |
| US CCER | Average Hourly Upstream Correctable Codeword Error Rate in % |
| US SNR | Instantaneous Hourly Upstream SNR in DB |
| US Tx Pwr Lo | CM Instantaneous Hourly Upstream Transmit Power in dBmV |
| US Rx Pwr Lo | CMTS Instantaneous Hourly Upstream Receive Power per CM in dBmV |
| DS CER | Average Hourly Downstream Uncorrectable Codeword Error Rate in % |
| DS CCER | Average Hourly Downstream Correctable Codeword Error Rate in % |
| DS SNR | Instantaneous Hourly Downstream SNR in DB |
| DS Pwr Hi | CM Instantaneous Hourly Downstream Receive Power in dBmV |
| DS Pwr Lo | CM Instantaneous Hourly Downstream Receive Power in dBmV |
| T3 | Sum of US CM Timeouts in 1 hour |
| T4 | Sum of DS CM Timeouts in 1 hour |
| Resets | Sum of CM Resets in 1 hour |
| Status | Instantaneous Hourly CM Status Value |
| StD US CER | Standard Deviation of last 24-hourly US CER readings |
| StD US SNR | Standard Deviation of last 24-hourly US SNR readings |
| StD US Pwr | Standard Deviation of last 24-hourly US Power readings |
| StD DS CER | Standard Deviation of last 24-hourly DS CER readings |
| StD DS CCER | Standard Deviation of last 24-hourly DS CCER readings |
| StD DS SNR | Standard Deviation of last 24-hourly DS CER readings |
| StD DS Pwr | Standard Deviation of last 24-hourly DS Power readings |

In an embodiment, an operational metric includes Average Hourly Upstream Uncorrectable Codeword Error Rate (CER), Average Hourly Upstream Correctable Codeword Error Rate (CCER), Instantaneous Hourly Upstream Signal-to-noise Ratio (SNR), Cable Modem (CM) Instantaneous Hourly Upstream Transmit Power, Cable Modem Termination System (CMTS) Instantaneous Hourly Upstream Receive Power per CM, Average Hourly Downstream Uncorrectable CER, Average Hourly Downstream CCER, Instantaneous Hourly Downstream SNR, CM Instantaneous Hourly Downstream Receive Power HI, CM Instantaneous Hourly Downstream Receive Power LO, Sum of US CM Timeouts in 1 hour, Sum of Downstream CM Timeouts in 1 hour, Sum of CM Resets in 1 hour, Instantaneous Hourly CM Status Value, Standard Deviation of last 24-hourly US CER readings, Standard Deviation of last 24-hourly US SNR readings, Standard Deviation of last 24-hourly US Power readings, Standard Deviation of last 24-hourly DS CER readings, Standard Deviation of last 24-hourly DS CCER readings, Standard Deviation of last 24-hourly Downstream CER readings, and/or Standard Deviation of last 24-hourly Downstream Power readings.

Flow 400 proceeds to step 420.

At step 420, outside plant analysis system 163 may obtain physical level measurements for customer premise devices such as 231 and 232 from telemetry system 160 based on the operational metric schedule or on demand. As an example, telemetry system 160 may poll and store physical level measurements associated with one or more customer premise devices of the customer accounts of system 100. For example, telemetry system 160 may poll customer premise devices associated with a customer account and receive physical level measurements (e.g., DOCSIS measurements) including transmission power and signal to noise ratio (SNR) that provide insight on the quality of service of each customer premise device and/or service experience of the customer account.

When a fault is suspected, telemetry system 160 may poll and store one or more physical level measurements associated with a customer premise device, one or more customer premise devices associated with a customer account, and/or one or more customer premise devices associated with a parent NE over a smaller time period such as every minute or every 10 seconds. In another example, telemetry system 160 may poll and store one or more physical level measurements over longer time periods. In an embodiment, outside plant analysis system 163 is configured to receive the physical level measurement(s) every hour, every 24 hours, every minute, every 10 seconds, or on request to accommodate the schedule of the operational metric schedule. In addition, telemetry system 160 or outside plant analysis system 163 may calculate standard deviation operational metrics periodically such as every hour, based on physical level measurement data collected over the past 24 hours to determine a range of values for a standard deviation operational metric. Flow 400 proceeds to step 430.

At step 430, outside plant analysis system 163 compares physical level measurement data with a corresponding operational metric threshold value to determine whether a customer premised device is considered failed. For example, a physical level measurement of a customer premise device may be compared against a settable operational metric threshold value to determine if the customer premise device passes, fails. A standard deviation operational metric is a measure of spread or variability in data from the last 24 hourly samples, and may be used to determine if an intermittent problem exists for a customer premise device. For example, if physical level measurement data collected over the last 24 hour period fluctuated abnormally outside of an acceptable range, that may be indicative of an intermittent problem with the associated customer premise device.

For example, an operational metric test such as an average hourly upstream uncorrectable codeword error rate (US CER), may be based on physical level measurements of code word error rate of an upstream transmission from a customer premise device (e.g., a cable modem) to cable headend system 105. Outside plant analysis system 163 may obtain the physical level measurement from telemetry system 160 for customer premise devices 231 and 232 and compare them with the operational metric threshold values to determine whether customer premise devices 231 and 232 have failed. The operational metric threshold values are settable by a network management system, for example.

Telemetry system 160 may also poll NEs such as a CMTS or a hub within additional NEs and transport networks 120 of FIG. 1 to obtain physical level measurements and/or operational metrics.

In one example, a customer account is considered failed when one or more customer premise devices of the customer account fails. In another example, when a customer account includes more than one customer premise device, an average of the physical level measurements of each failed customer premise device of the customer account may be compared against an operational metric settable threshold. For example, when the average of the physical level measurements associated with each failed customer premise device satisfies a settable operational metric threshold value, the customer account may be considered failed. For example, depending on the operational metric threshold, satisfying the operational metric threshold may include meeting and/or exceeding the operational metric threshold value; in another example, satisfying the operational metric threshold may include meeting and/or being below the operational metric threshold value.

Flow 400 ends.

In an embodiment, to determine when the customer premise device fails, one or more processors are further configured to receive an operational metric type, obtain physical level measurement data associated with the customer premise device, compare the physical level measurement data with a threshold value of the operational metric type, and based on the comparison, determine when the customer premise device fails.

Flow 400 may be performed by outside plant analysis system 163. In an embodiment, telemetry system 160 may perform steps 420 and 430 and transmit the information to outside plant analysis system 163. In another embodiment, telemetry system 160 can perform steps 420 and 430 and outside plant analysis system 163 polls telemetry system 160 for the results of the operational metric tests for customer premise devices such as 231 and 232.

Returning to step 340 of flow 300, outside plant analysis system 163 may determine a percentage of failed customer accounts served by each NE based on operational metric test results. For example, outside plant analysis system 163 may determine a percentage of failed customer accounts based on whether a customer premise device associated with each customer account has failed an operational metric test. The results are associated with each parent NE on connectivity trail 200, for example. The percentage of failed customer accounts based on an operational metric is equal to (the number of failed customer accounts served by the NE divided by the total number of customer accounts served by the NE)×100 as shown below:

% of failed customer accounts of an $$NE = \frac{\text{Number of failed customer accounts served by the } NE}{\text{Total number of customer accounts served by the } NE} \times 100$$

As an example, as described in step 330, outside plant analysis system 163 may compare physical level measurements of customer premise device 231 such as an Average Hourly Upstream Uncorrectable Codeword Error Rate, against a settable US CER operational metric threshold value. When physical level measurements of customer premise device 231 of customer account 230a exceeds the US CER operational metric threshold value, customer account 230a may be considered failed. In an example, even if another customer premise device such as 232 has not failed the same operational metric test, customer account 230a may be considered failed. Customer account 230a status of failed or not failed is applied to the parent NEs of the connectivity trail 200 up through node 280. Thus, the status of customer account 230a is used to determine the percentage of failed customer accounts for the following parent NEs of connectivity trail 200: Taps 208f, 208c, which have 100% failed customer accounts; line extender amplifier 286b which as 35% failed customer accounts, bridge amplifier 284 at 20% failed customer accounts, trunk amplifier 282 at 12% failed customer accounts, splitter 288 at 7% failed customer accounts, and node 280 at 3% failed customer accounts.

In an embodiment, to calculate a percentage of failed customer accounts for an NE, one or more processors determine a total number of customer accounts associated with the NE, determine a number of failed customer accounts associated with the NE, and divide the number of failed customer accounts associated with the NE by the total number of customer accounts associated with the NE. The result may be multiplied by 100 to determine the percentage.

In another example, more than one operational metric may be considered in determining the percentage of failed customer accounts for each NE. Thus, a customer account that passed based on a first operational metric may be considered failed when a second operational metric is applied. Applying a different operational metric may provide insight to different types of troubles and enable detection of additionally failed customer premise devices, and lead to detection of corresponding failed parent NEs. In an example, one or more additional operational metrics from Table 1 may be applied to determine the percentage of failed customer accounts of the NEs. The additional operational metrics may be performed according to a schedule, on demand. Further, an operational metric may be weighted differently than another to indicate a higher priority.

Flow 300 proceeds to step 350.

At step 350, a determination is made whether an NE is failed. In an embodiment, to select an NE to determine whether the NE has failed, the determination starts from the top of connectivity trail and proceeds towards the customer premise device. That is, the determination begins at an NE that is closest to the headend, and then continues searching for failed NEs extending towards the customer premise device, in a top-down approach.

In another embodiment, to determine whether an NE has failed, the determination starts from the bottom of connectivity trail towards the NE that is closest to the headend. That is, the determination begins with an NE that is closest to a customer premise device, and continues searching for any failed NEs extending towards an NE that is closest to the headend, in a bottom-up approach.

When the NE is considered as not failed, flow 300 returns to step 330 to perform another operational metric test. When the NE is considered failed, flow 300 proceeds to step 360.

To be considered as failed, an NE serves a minimum number of customer accounts, the NE is not associated with a failed parent NE, and the percentage of failed customer accounts calculated for the NE is greater than a settable failed rate threshold.

When the parent NE of the NE is determined to be failed, the NE and any siblings of the NE are not considered as failed even though their percentage of failed customer accounts calculated may exceed the failure rate threshold. Thus, NEs closest to the core (e.g., node 280) can be identified and addressed first. Problems in child NEs can be recorded over a period of time (e.g., a 30 day period) to determine whether parent NEs that have been repaired have resolved the child NE problems. If the child NE problem still remains after the parent NE has been repaired, the child NE will be identified as a failed NE in subsequent flows.

For example, an NE may serve or be associated with a minimum of 2 customer accounts. The percentage of failed customer accounts calculated for the NE is compared with a failure rate threshold. When the percentage of failed customer accounts calculated for the NE is greater than the failure rate threshold, the NE serves the minimum number of customer accounts, and a parent NE of the NE has not also failed, then the NE is determined to be failed.

In system 200, with a failure rate threshold of 80%, for example, even though distribution tap 208f serves customer accounts 230a and 230b and the percentage of failed customer accounts calculated for tap 208f exceeds the 80% failure rate threshold, tap 208f is not determined as failed because its parent NE, tap 208c, is determined to be failed. For example, 208c serves more than the minimum number of customer accounts, the parent NE for distribution tap 208c, line extender amplifier 286b, has a percentage of failed customer accounts at 35% and is not determined to be failed, and distribution tap 208c's percentage of failed customer accounts is greater than the 80% failure rate threshold. Note that once the problems of 208c are identified and repaired, troubles in child NEs such as 208d, 208e, and 208f may be resolved. If the troubles in the child NEs are not resolved, the child NEs may be determined as failed NEs in subsequent operational metric tests, and then addressed accordingly.

In an example, if information about taps 208d, 208e, and 208f which are performing poorly but are not determined to be failed, were sent to outside plant ticketing system 110, task-specific GPS-enabled network fault annunciator 175 may identify the tickets associated with taps 208d, 208e, and 208f as futile tickets since the ticket for parent NE, tap 208c, is already ticketed.

Note that conventional partial-node monitoring system would not detect that customers downstream from tap 208c are experience complete failures since node 280 is indicating a mere 3% failure.

In an embodiment, to determine when the NE has failed, one or more processors are configured to: when the NE serves at least X customer accounts, where X is an integer greater than one, compare the percentage of failed customer accounts calculated for the NE with a first failure rate threshold, and when the percentage of failed customer accounts calculated for the NE is greater than the first failure rate threshold, and a parent NE of the NE has not failed, determine the NE as failed.

In an example, the minimum number of customer accounts and the failure rate thresholds may be different for different types of NEs (e.g., parent NEs).

In an embodiment, to determine when a parent NE of the NE has failed, one or more processors are further configured to: when the parent NE serves at least Y customer accounts, where Y is an integer greater than one, compare a percentage of failed customer accounts associated with the parent NE with a second failure rate threshold; when the percentage of failed customer accounts is greater than the second failure threshold, and the parent NE does not have a failed parent NE, determine the parent NE as failed.

Flow 300 continues to step 360.

At step 360, records are updated and ticketing systems are notified accordingly. For example, connectivity trail records as shown in FIG. 2B may be augmented to include at least one of the following data that may be transmitted to a ticketing system such as OSP ticketing system 110: an identification number of the NE, a physical location of the NE, a geographic region of the NE, the operational metric type, the total number of customer accounts associated with the NE, a number of failed customer accounts associated with the NE, the percentage of failed customer accounts calculated, a number of times the NE has failed within a previous period due to the operational metric type, and an aggregated PHY score of the NE. In addition, at least one of the following may also be transmitted: an identification number of a parent NE of the NE, and an equipment type of the parent NE.

Flow 300 may also determine a severity of an NE's failure by determining an aggregated PHY score for each NE on the connectivity trail based on average PHY scores for each customer account where each customer account may include one or more customer premise devices. Determining an average PHY score is described in U.S. patent application Ser. No. 14/589,706, filed on Jan. 5, 2015, entitled *System and Method for Proactive Customer Access Network Maintenance*, which is incorporated herein by reference in its entirety. A customer premise device is considered failed when either an upstream PHY score and/or a downstream PHY score is non-zero. When a customer account includes more than one customer premise device, the upstream PHY score and the downstream PHY score of the more than one customer premise devices may be summed and divided by the number of failed customer premise devices to create an average PHY score for the customer account. The average PHY score is an indication of a severity of a problem where a larger average PHY score is an indication of a customer account experiencing a more severe problem than a customer account with a lower average PHY score.

In an embodiment, outside plant analysis system 163 may determine an aggregated PHY score for an NE by obtaining average PHY scores of each customer account (e.g., 230a and 230b) associated with the NE, from telemetry system 160, and summing the average PHY scores. In another example, telemetry system 160 may poll customer premise devices associated with a customer account, and outside plant analysis system 163 may determine an average PHY score for the customer account, associate them with the NEs on connectivity trail 200, and then calculate aggregated PHY scores for each NE of the connectivity trail 200.

A high aggregated PHY score is indicative of a more severe problem than a lower aggregated PHY score. In an embodiment, one or more processors are further configured to determine a severity of the percentage of failed customer accounts based on an aggregated PHY score based on a summation of an average PHY score from each associated customer account. Flow 300 ends.

Embodiments include a memory, and one or more processors. The one or more processors are configured to obtain a connectivity trail of network elements (NEs) that begins at a node and extends toward a customer premise device, associate the customer premise device with a customer account, associate the customer premise device and the customer account with respective parent NEs of the connectivity trail, determine when the customer premise device fails based on an operational metric type, calculate a percentage of failed customer accounts for an NE of the connectivity trail, determine when the NE has failed, and when the NE has failed, notify a ticketing system.

Figure 5:
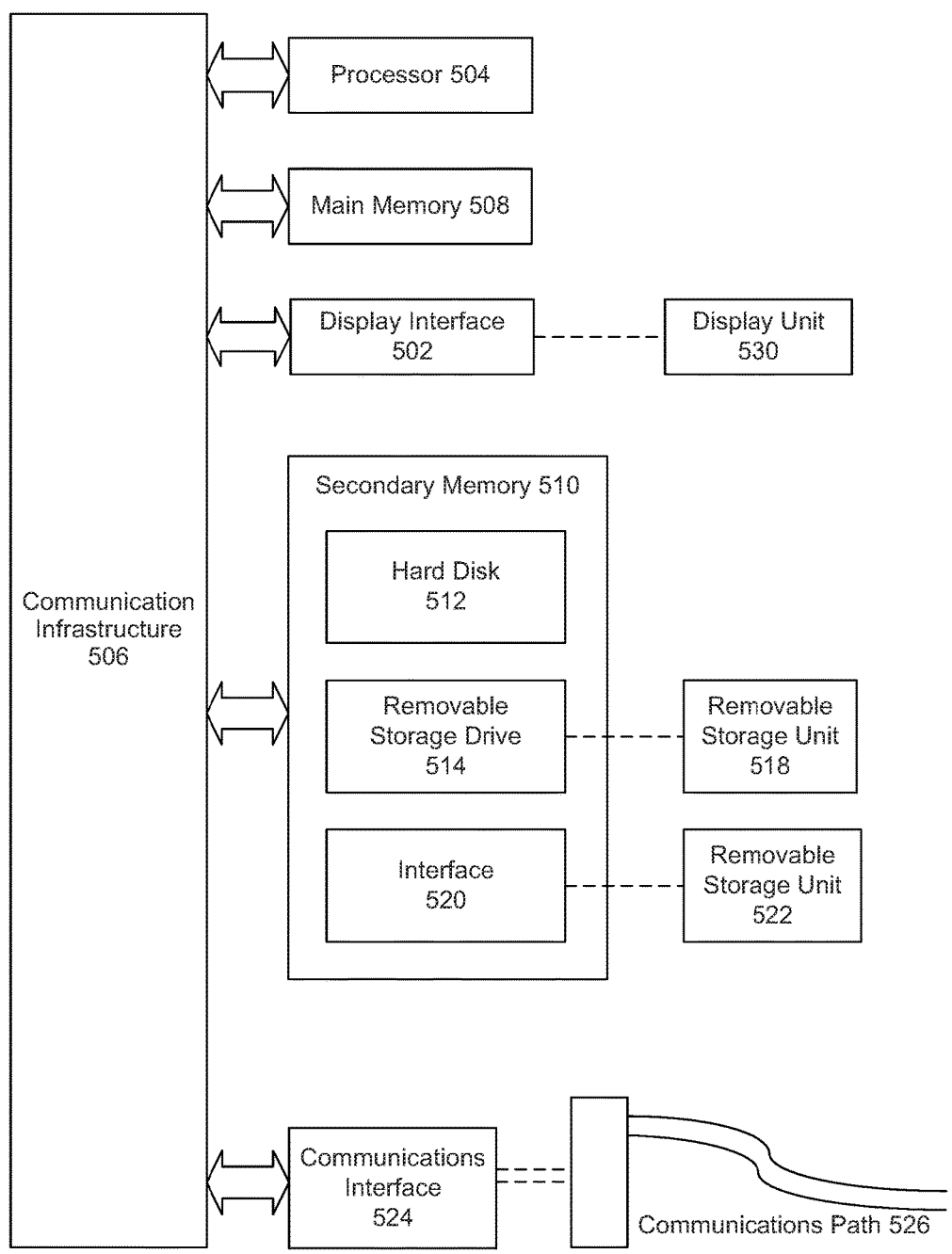
FIG. 5 illustrates an example computer system which can be used to implement an embodiment.

Various aspects of the disclosure can be implemented by software, firmware, hardware, or a combination thereof. FIG. 5 illustrates an example computer system 500 in which some embodiments, or portions thereof, can be implemented as computer-readable code. Various embodiments are described in terms of the example computer system 500. After reading this description, it will become apparent to a person skilled in the relevant art how to implement the embodiments using other computer systems and/or computer architectures. For example, outside plant analysis system 163 may be implemented by computer system 500.

Computer system 500 includes one or more processors, such as processor 504. Processor 504 may comprise suitable logic, circuitry, dedicated circuits, and/or code that may enable processing data and/or controlling operations of computer system 500. Processor 504 can be a special purpose or a general purpose processor. Processor 504 is connected to a communication infrastructure 506 (for example, a bus or network). Processor 504 may be enabled to provide control signals to the various other portions of computer system 500 via communication infrastructure 506, for example. As an example, processor 504 may be configured to perform the flows as described in FIGS. 3 and 4, to determine outside plant issues and for determining a failed customer premise device.

Computer system 500 also includes a main memory 508, and may also include a secondary memory 510. Secondary memory 510 may include, for example, a hard disk drive 512, a removable storage drive 514, and/or a memory stick. Removable storage drive 514 may comprise a floppy disk drive, a magnetic tape drive, an optical disk drive, a flash memory, or the like. The removable storage drive 514 reads from and/or writes to a removable storage unit 518 in a well-known manner. Removable storage unit 518 may comprise a floppy disk, magnetic tape, optical disk, etc. that is read by and written to by removable storage drive 514. As will be appreciated by persons skilled in the relevant art(s), removable storage unit 518 includes a computer usable storage medium having stored therein computer software and/or data.

In alternative implementations, secondary memory 510 may include other similar means for allowing computer programs or other instructions to be loaded into computer system 500. Such means may include, for example, a removable storage unit 522 and an interface 520. Examples of such means may include a program cartridge and cartridge interface (such as that found in video game devices), a removable memory chip (such as an EPROM, or PROM) and associated socket, and other removable storage units 522 and interfaces 520 that allow software and data to be transferred from the removable storage unit 522 to computer system 500.

Computer system 500 may also include a communications interface 524. Communications interface 524 allows software and data to be transferred between computer system 500 and external devices. Communications interface 524 may include a modem, a network interface (such as an Ethernet card), a communications port, a PCMCIA slot and card, or the like. Software and data transferred via communications interface 524 are in the form of signals that may be electronic, electromagnetic, optical, or other signals capable of being received by communications interface 524. These signals are provided to communications interface 524 via a communications path 526. Communications path 526 carries signals and may be implemented using wire or cable, fiber optics, a phone line, a cellular phone link, an RF link or other communications channels.

In this document, the terms "computer program medium" and "computer usable medium" are used to generally refer to media such as removable storage unit 518, removable storage unit 522, and a hard disk installed in hard disk drive 512. Computer program medium and computer usable medium can also refer to memories, such as main memory 508 and secondary memory 510, which can be memory semiconductors (e.g. DRAMs, etc.). These computer program products are means for providing software to computer system 500.

Computer programs (also called computer control logic) are stored in main memory 508 and/or secondary memory 510. Computer programs may also be received via communications interface 524. Such computer programs, when executed, enable computer system 500 to implement the embodiments as discussed herein. In particular, the computer programs, when executed, enable processor 504 to implement the disclosed processes of FIGS. 3 and 4. Accordingly, such computer programs represent controllers of the computer system 500. Where the embodiments are implemented using software, the software may be stored in a computer program product and loaded into computer system 500 using removable storage drive 514, interface 520, hard drive 512 or communications interface 524. This can be accomplished, for example, through the use of general-programming languages (such as C or C++). The computer program code can be disposed in any known computer-readable medium including semiconductor, magnetic disk, or optical disk (such as, CD-ROM, DVD-ROM). As such, the code can be transmitted over communication networks including the Internet and internets. It is understood that the functions accomplished and/or structure provided by the systems and techniques described above can be represented in a core (such as a processing-unit core) that is embodied in program code and may be transformed to hardware as part of the production of integrated circuits. This can be accomplished, for example, through the use of hardware-description languages (HDL) including Verilog HDL, VHDL, Altera HDL (AHDL) and so on, or other available programming and/or schematic-capture tools (such as, circuit-capture tools).

Embodiments are also directed to computer program products comprising software stored on any non-transitory computer useable medium. Such software, when executed in one or more data processing device, causes a data processing device(s) to operate as described herein, for example, to perform the operations of FIGS. 3 and 4. Embodiments employ any computer useable or readable medium, known now or in the future. Examples of computer useable mediums include, but are not limited to, primary storage devices (e.g., any type of random access memory), secondary storage devices (e.g., hard drives, floppy disks, CD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.).

It is to be appreciated that the Detailed Description section, and not the Abstract section, is intended to be used to interpret the claims. The Abstract section may set forth one or more but not all exemplary embodiments as contemplated by the inventor(s), and thus, are not intended to limit the embodiments and the appended claims in any way.

The accompanying drawings, which are incorporated herein and form part of the specification, illustrate the embodiments and, together with the description, further serve to explain the principles of the embodiments and to enable a person skilled in the pertinent art to make and use the embodiments. The embodiments will be described with reference to the accompanying drawings. Generally, the drawing in which an element first appears is typically indicated by the leftmost digit(s) in the corresponding reference number.

The embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the embodiments that others can, by applying knowledge within the skill of the art, readily modify and/or adapt for various applications such specific embodiments, without undue experimentation, without departing from the general concepts of the embodiments. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the embodiments should not be limited by any of the above-described exemplary embodiments, but should be defined only in accordance with the following claims and their equivalents.

What is claimed is:

1. A system, comprising:
a memory; and
one or more processors configured to:
obtain a connectivity trail of network elements (NEs) that begins at a headend or a first NE between the headend and a customer premise device, and extends toward the customer premise device;
associate the customer premise device with a customer account;
associate the customer account with respective parent NEs including the first NE of the connectivity trail;
determine that the customer premise device has failed based on an operational metric wherein the operational metric comprises at least one of: Average Hourly Upstream Uncorrectable Codeword Error Rate (CER), Average Hourly Upstream Correctable Codeword Error Rate (CCER), Instantaneous Hourly Upstream Signal-to-noise Ratio (SNR), Cable Modem (CM) Instantaneous Hourly Upstream Transmit Power, Cable Modem Termination System (CMTS) Instantaneous Hourly Upstream Receive Power per CM, Average Hourly Downstream Uncorrectable CER, Average Hourly Downstream CCER, Instantaneous Hourly Downstream SNR, CM Instantaneous Hourly Downstream Receive Power HI, CM Instantaneous Hourly Downstream Receive Power LO, Sum of US CM Timeouts in 1 hour, Sum of Downstream CM Timeouts in 1 hour, Sum of CM Resets in 1 hour, Instantaneous Hourly CM Status Value, Standard Deviation of last 24-hourly US CER readings, Standard Deviation of last 24-hourly US SNR readings, Standard Deviation of last 24-hourly US Power readings, Standard Deviation of last 24-hourly DS CER readings, Standard Deviation of last 24-hourly DS CCER readings, Standard Deviation of last 24-hourly Downstream CER readings, or Standard Deviation of last 24-hourly Downstream Power readings;
calculate a percentage of failed customer accounts for a second NE of the respective parent NEs of the connectivity trail; and
determine whether the second NE has failed.

2. The system of claim 1, wherein to determine that the customer premise device has failed, the one or more processors are configured to:
receive the operational metric;
obtain physical level measurement data associated with the customer premise device;
compare the physical level measurement data with a threshold value of the operational metric; and
based on the comparison, determine that the physical level measurement data satisfies the threshold value.

3. The system of claim 1, wherein to calculate the percentage of failed customer accounts for the second NE, the one or more processors are configured to:
determine a total number of customer accounts associated with the second NE;
determine a number of failed customer accounts associated with the second NE; and
divide the number of failed customer accounts associated with the second NE by the total number of customer accounts associated with the second NE.

4. The system of claim 1, wherein to determine whether the second NE has failed, the one or more processors are configured to:
compare the percentage of failed customer accounts calculated for the second NE with a first failure rate threshold, wherein the second NE serves at least X customer accounts, where X is an integer greater than one;

determine that the percentage of failed customer accounts calculated for the second NE satisfies the first failure rate threshold;

determine that a parent NE of the second NE has not failed; and determine that the second NE has failed.

5. The system of claim 4, wherein the one or more processors are further configured to:

reboot the failed second NE; or notify a ticketing system.

6. The system of claim 5, wherein to notify the ticketing system, the one or more processors are configured to:

transmit at least one of: an identification number of the second NE, a physical location of the second NE, a geographic region of the second NE, the operational metric type, a total number of customer accounts associated with the second NE, a number of failed customer accounts associated with the second NE, the percentage of failed customer accounts calculated, a number of times the second NE has failed within a previous period due to the operational metric type, or an aggregated PHY score of the second NE.

7. The system of claim 6, wherein the one or more processors are further configured to transmit at least one of: an identification number of a parent NE of the second NE, or an equipment of the parent NE.

8. The system of claim 1, wherein to determine whether a parent NE of the second NE has failed, the one or more processors are further configured to:

compare a percentage of failed customer accounts associated with the parent NE with a second failure rate threshold, wherein the parent NE serves at least Y customer accounts, where Y is an integer greater than one;

determine that the percentage of failed customer accounts associated with the parent NE satisfies the second failure threshold;

determine that an other parent NE of the parent NE has not failed; and determine that the parent NE has failed.

9. The system of claim 1, wherein the one or more processors are further configured to:

present on a graphical user interface (GUI) at least one of: the connectivity trail, a status of the second NE of the connectivity trail, the associated customer account, or the associated customer premise device.

10. The system of claim 1, wherein the one or more processors are further configured to:

present the connectivity trail in at least one of: a tabular form, a geographic map, or a tree map.

11. The system of claim 1, wherein to determine that the customer account has failed, the one or more processors are further configured to:

apply a same operational metric to a second customer premise device associated with the customer account, wherein the customer account has failed even if the second customer premise device has not failed.

12. The system of claim 1, wherein to determine that the customer premise device has failed, the one or more processors are further configured to:

perform on demand, additional operational metrics for the customer premise device.

13. The system of claim 12, wherein the operational metric is weighted differently than a second operational metric of the additional operational metrics.

14. The system of claim 1, wherein the one or more processors are further configured to:

determine that the customer account has failed based on the customer premise device that failed, wherein the percentage of failed customer accounts calculated includes the customer account that failed.

15. A method for a monitoring system including one or more processors, the method comprising:

obtaining a connectivity trail of network elements (NEs) that begins at a headend or a first NE between the headend and a customer premise device, and extends toward the customer premise device;

associating the customer premise device with a customer account;

associating the customer account with respective parent NEs including the first NE of the connectivity trail;

determining that the customer premise device has failed based on an operational metric wherein the operational metric comprises at least one of: Average Hourly Upstream Uncorrectable Codeword Error Rate (CER), Average Hourly Upstream Correctable Codeword Error Rate (CCER), Instantaneous Hourly Upstream Signal-to-noise Ratio (SNR), Cable Modem (CM) Instantaneous Hourly Upstream Transmit Power, Cable Modem Termination System (CMTS) Instantaneous Hourly Upstream Receive Power per CM, Average Hourly Downstream Uncorrectable CER, Average Hourly Downstream CCER, Instantaneous Hourly Downstream SNR, CM Instantaneous Hourly Downstream Receive Power HI, CM Instantaneous Hourly Downstream Receive Power LO, Sum of US CM Timeouts in 1 hour, Sum of Downstream CM Timeouts in 1 hour, Sum of CM Resets in 1 hour, Instantaneous Hourly CM Status Value, Standard Deviation of last 24-hourly US CER readings, Standard Deviation of last 24-hourly US SNR readings, Standard Deviation of last 24-hourly US Power readings, Standard Deviation of last 24-hourly DS CER readings, Standard Deviation of last 24-hourly DS CCER readings, Standard Deviation of last 24-hourly Downstream CER readings, or Standard Deviation of last 24-hourly Downstream Power readings;

calculating a percentage of failed customer accounts for a second NE of the respective parent NEs of the connectivity trail; and determining whether the second NE has failed.

16. The method of claim 15, wherein the determining that the customer premise device has failed comprises:

receiving the operational metric;

obtaining physical level measurement data associated with the customer premise device;

comparing the physical level measurement data with a threshold value of the operational metric; and based on the comparison, determining that the physical level measurement data satisfies the threshold value.

17. The method of claim 15, wherein the calculating the percentage of failed customer accounts for the second NE comprises:

determining a total number of customer accounts associated with the second NE;

determining a number of failed customer accounts associated with the second NE; and dividing the number of failed customer accounts associated with the second NE by the total number of customer accounts associated with the second NE.

18. The method of claim 15, wherein the determining whether the second NE has failed comprises:
   comparing the percentage of failed customer accounts calculated for the second NE with a first failure rate threshold, wherein the second NE serves at least X customer accounts, where X is an integer greater than one;
   determining that the percentage of failed customer accounts calculated for the second NE satisfies the first failure rate threshold;
   determining that a parent NE of the second NE has not failed; and
   determining that the second NE has failed.

19. The method of claim 15, further comprising determining whether a parent NE of the second NE has failed, the determining whether the parent NE has failed comprising:
   comparing a percentage of failed customer accounts associated with the parent NE with a second failure rate threshold, wherein the parent NE serves at least Y customer accounts, where Y is an integer greater than one;
   determining that the percentage of failed customer accounts associated with the parent NE satisfies the second failure threshold;
   determining that an other parent NE of the parent NE has not failed; and
   determining that the parent NE has failed.

20. A non-transitory computer-readable medium having instructions stored thereon, which when executed by a processor in an electronic device cause the processor to perform operations comprising:
   obtaining a connectivity trail of network elements (NEs) that begins at a headend or a first NE between the headend and a customer premise device, and extends toward the customer premise device;
   associating the customer premise device with a customer account;
   associating the customer account with respective parent NEs including the first NE of the connectivity trail;
   determining that the customer premise device has failed based on an operational metric wherein the operational metric comprises at least one of: Average Hourly Upstream Uncorrectable Codeword Error Rate (CER), Average Hourly Upstream Correctable Codeword Error Rate (CCER), Instantaneous Hourly Upstream Signal-to-noise Ratio (SNR), Cable Modem (CM) Instantaneous Hourly Upstream Transmit Power, Cable Modem Termination System (CMTS) Instantaneous Hourly Upstream Receive Power per CM, Average Hourly Downstream Uncorrectable CER, Average Hourly Downstream CCER, Instantaneous Hourly Downstream SNR, CM Instantaneous Hourly Downstream Receive Power HI, CM Instantaneous Hourly Downstream Receive Power LO, Sum of US CM Timeouts in 1 hour, Sum of Downstream CM Timeouts in 1 hour, Sum of CM Resets in 1 hour, Instantaneous Hourly CM Status Value, Standard Deviation of last 24-hourly US CER readings, Standard Deviation of last 24-hourly US SNR readings, Standard Deviation of last 24-hourly US Power readings, Standard Deviation of last 24-hourly DS CER readings, Standard Deviation of last 24-hourly DS CCER readings, Standard Deviation of last 24-hourly Downstream CER readings, or Standard Deviation of last 24-hourly Downstream Power readings;
   calculating a percentage of failed customer accounts for a second NE of the respective parent NEs of the connectivity trail; and
   determining whether the second NE has failed.

* * * * *

UNITED STATES PATENT AND TRADEMARK OFFICE
CERTIFICATE OF CORRECTION

| | | |
|---|---|---|
| PATENT NO. | : 9,960,951 B1 | Page 1 of 1 |
| APPLICATION NO. | : 15/070907 | |
| DATED | : May 1, 2018 | |
| INVENTOR(S) | : Cruickshank, III et al. | |

It is certified that error appears in the above-identified patent and that said Letters Patent is hereby corrected as shown below:

In the Specification

In Column 15, Line 4, delete "(HDL)" and insert -- (HDLs) --, therefor.

In Column 15, Line 5, delete "HDL, VHDL," and insert -- HDL (VHDL), --, therefor.

In the Claims

In Column 17, Line 20, Claim 6, delete "metric type," and insert -- metric, --, therefor.

In Column 17, Line 25, Claim 6, delete "metric type," and insert -- metric, --, therefor.

Signed and Sealed this
Twenty-eighth Day of May, 2019

Andrei Iancu
*Director of the United States Patent and Trademark Office*